(12) United States Patent
Yamaguchi et al.

(10) Patent No.: US 10,513,258 B2
(45) Date of Patent: Dec. 24, 2019

(54) DEVICE FOR CONTROLLING HYBRID VEHICLE AND METHOD FOR CONTROLLING HYBRID VEHICLE

(71) Applicant: Mitsubishi Electric Corporation, Tokyo (JP)

(72) Inventors: Shingo Yamaguchi, Tokyo (JP); Toshiaki Date, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 209 days.

(21) Appl. No.: 15/549,753

(22) PCT Filed: Apr. 17, 2015

(86) PCT No.: PCT/JP2015/061845
§ 371 (c)(1),
(2) Date: Aug. 9, 2017

(87) PCT Pub. No.: WO2016/166884
PCT Pub. Date: Oct. 20, 2016

(65) Prior Publication Data
US 2018/0056984 A1 Mar. 1, 2018

(51) Int. Cl.
*B60W 20/50* (2016.01)
*B60K 6/485* (2007.10)
(Continued)

(52) U.S. Cl.
CPC ............. *B60W 20/50* (2013.01); *B60K 6/485* (2013.01); *B60K 6/54* (2013.01); *B60L 3/0038* (2013.01);
(Continued)

(58) Field of Classification Search
CPC .......... B60W 20/50; B60W 2510/081; B60W 20/30; B60W 50/023; B60W 10/08;
(Continued)

(56) References Cited

U.S. PATENT DOCUMENTS

| 2004/0149247 A1* | 8/2004 | Kataoka | ................ F02N 11/006 123/179.4 |
| 2004/0153235 A1* | 8/2004 | Kataoka | ................ B60K 6/485 701/112 |

(Continued)

FOREIGN PATENT DOCUMENTS

| JP | 2-252971 A | 10/1990 |
| JP | 2001-20797 A | 1/2001 |

(Continued)

OTHER PUBLICATIONS

International Search Report of PCT/JP2015/061845 dated Jul. 21, 2015 [PCT/ISA/210].
(Continued)

*Primary Examiner* — Muhammad Shafi
(74) *Attorney, Agent, or Firm* — Sughrue Mion, PLLC; Richard C. Turner

(57) ABSTRACT

To reduce an error of a phase difference between an angle of a crankshaft of an internal combustion engine and an angle of a rotor of a motor generator, provided are a control device for a hybrid vehicle and a control method for a hybrid vehicle, for detecting the angle of the crankshaft, detecting the angle of the rotor of the motor generator, determining whether or not a condition for ensuring that the error of the phase difference between the angle of the crankshaft and the angle of the rotor of the motor generator is becomes small is satisfied, and calculating the phase difference when the error of the phase difference is determined to be small.

14 Claims, 6 Drawing Sheets

(51) Int. Cl.
  *B60W 10/06* (2006.01)
  *B60W 10/08* (2006.01)
  *B60K 6/54* (2007.10)
  *B60L 3/00* (2019.01)
  *B60W 20/30* (2016.01)
  *B60W 50/023* (2012.01)
  *B60L 50/16* (2019.01)
  *F02D 29/06* (2006.01)
  *F02D 45/00* (2006.01)
  *F02N 19/00* (2010.01)
  *B60W 50/02* (2012.01)

(52) U.S. Cl.
  CPC ............ *B60L 50/16* (2019.02); *B60W 10/06* (2013.01); *B60W 10/08* (2013.01); *B60W 20/30* (2013.01); *B60W 50/023* (2013.01); *B60L 2240/423* (2013.01); *B60W 2050/0215* (2013.01); *B60W 2510/0638* (2013.01); *B60W 2510/0685* (2013.01); *B60W 2510/081* (2013.01); *F02D 29/06* (2013.01); *F02D 45/00* (2013.01); *F02N 19/005* (2013.01); *Y02T 10/6226* (2013.01); *Y02T 10/6286* (2013.01)

(58) Field of Classification Search
  CPC ......... B60W 10/06; B60W 2510/0685; B60W 2510/0638; B60W 2050/0215; B60K 6/54; B60K 6/485; F02D 29/06; F02D 45/00; F02N 19/005; B60L 2240/423; B60L 50/16; B60L 3/0038; Y02T 10/6226; Y02T 10/6286

USPC .......................................................... 701/22
  See application file for complete search history.

(56) References Cited

U.S. PATENT DOCUMENTS

2013/0271051 A1  10/2013  Goto et al.
2015/0112532 A1   4/2015  Oono et al.

FOREIGN PATENT DOCUMENTS

| JP | 2001-057710 | * | 2/2001 |
| JP | 2001-057710 | A | 2/2001 |
| JP | 2002-271903 | A | 9/2002 |
| JP | 2004-068632 | A | 3/2004 |
| JP | 2004-232488 | * | 8/2004 |
| JP | 3812195 | B2 | 8/2006 |
| JP | 2010-209700 | * | 9/2010 |
| JP | 2012-136202 | A | 7/2012 |
| JP | 2013-072686 | A | 4/2013 |
| WO | 2013/157315 | A1 | 10/2013 |

OTHER PUBLICATIONS

Communication dated Oct. 2, 2018, issued by the Japanese Patent Office in counterpart application No. 2017-512166.

* cited by examiner

DEVICE FOR CONTROLLING HYBRID VEHICLE AND METHOD FOR CONTROLLING HYBRID VEHICLE

CROSS REFERENCE TO RELATED APPLICATIONS

This application is a National Stage of International Application No. PCT/JP2015/061845, filed Apr. 17, 2015, the contents of which are incorporated herein by reference in its entirety.

TECHNICAL FIELD

The present invention relates to a control device and a control method to be mounted on a hybrid vehicle, and more particularly, to a control device for a hybrid vehicle including a crank angle sensor configured to detect an angle of a crankshaft in an internal combustion engine and a rotor angle sensor configured to detect an angle of a rotor in a motor generator, and a control method for the hybrid vehicle.

BACKGROUND ART

In recent years, there has emerged a hybrid vehicle having both an internal combustion engine and a motor generator mounted thereon in order to reduce a fuel consumption amount of a vehicle. The hybrid vehicle identifies a cylinder based on a crank angle and a cam angle, and injects and ignites fuel at an appropriate timing based on the identification information on the cylinder so as to rotate the internal combustion engine and output torque. Thus, a crank angle sensor is mounted on a crankshaft of the internal combustion engine to detect an angle of the crankshaft.

Also, the motor generator causes an alternating current to flow in accordance with a difference in angle between a stator and a rotor so as to rotate the rotor and output torque. Thus, an angle sensor is mounted on the rotor to detect an angle of the rotor with respect to the stator.

It is necessary to detect the crank angle in order to rotate the internal combustion engine, so that when the crank angle sensor has failed, the internal combustion engine cannot be rotated. Meanwhile, it is necessary to have a rotor angle sensor in order to rotate the motor generator, so that when the rotor angle sensor has failed, the motor generator cannot be rotated.

In view of the above, there is proposed a control device for a hybrid vehicle, including means for calculating a phase difference between the crank angle and the rotor angle when the number of revolutions of the engine is equal to or larger than a set value, the control device being configured to: calculate a pseudo crank angle using a phase difference between a first resolver configured to detect a crank angle and a second resolver configured to detect a rotor angle in preparation for a case in which the first resolver has failed; and calculate a pseudo rotor angle using the crank angle and the phase difference in preparation for a case in which the second resolver has failed, to thereby enable rotation of the internal combustion engine and the motor generator (e.g., refer to Patent Literature 1).

CITATION LIST

Patent Literature

[PTL 1] JP 3812195 B

SUMMARY OF INVENTION

Problem to be Solved by Invention

When a variation in the number of revolutions of the crankshaft in the internal combustion engine becomes larger, an error of output of the crank angle sensor with respect to an actual crank angle also becomes larger. Meanwhile, as a variation in the number of revolutions of the rotor in the motor generator becomes larger, an error of output of the rotor angle sensor with respect to an actual rotor angle also becomes larger.

Further, in a case where the number of revolutions of the internal combustion engine is high, due to a signal delay of from detection of an angle by the crank angle sensor until the angle detected by the crank angle sensor is input to the microcomputer, when a microcomputer recognizes the crank angle, the angle of the internal combustion engine has already moved ahead, so that that the microcomputer has a large detection error. Meanwhile, in a case where the number of revolutions of the motor generator is high, due to a signal delay of from detection of an angle by the crank angle sensor until the angle detected by the crank angle sensor is input to the microcomputer, when the microcomputer recognizes the rotor angle, the angle of the motor generator has already moved ahead due to a signal delay of from detection of an angle by the rotor angle sensor until the angle is input to the microcomputer, so that the microcomputer has a large detection error.

The related art disclosed in Patent Literature 1 has a problem in that the phase difference between the crank angle and the rotor angle is calculated even when the above-mentioned error occurs, and thus the error of the phase difference becomes large.

The present invention has been made in view of the above-mentioned problem, and an object thereof is to provide a control device for a hybrid vehicle for reducing an error of a phase difference between a crank angle and a rotor angle.

In order to achieve the above object, a control device for a hybrid vehicle according to the present invention, in which a crankshaft of an internal combustion engine is connected to a motor generator, comprises: a crank angle sensor configured to detect an angle of the crankshaft; a rotor angle sensor configured to detect an angle of a rotor of the motor generator; and a calculation unit configured to determine whether or not a condition for ensuring that an error of a phase difference between the angle of the crankshaft and the angle of the rotor of the motor generator becomes small is satisfied, and to calculate the phase difference when the error of the phase difference is determined to be small.

Also, the present invention provides a control method for a hybrid vehicle, in which a crankshaft of an internal combustion engine is connected to a motor generator, the control method comprising: detecting an angle of the crankshaft; detecting an angle of a rotor of the motor generator; and determining whether or not a condition for ensuring that an error of a phase difference between the angle of the crankshaft and the angle of the rotor of the motor generator is made small is satisfied, and calculating the phase difference when the error of the phase difference is determined to be small.

Advantageous Effects of Invention

According to the control device for a hybrid vehicle and the control method for a hybrid vehicle of the present invention, it is determined whether or not the condition for ensuring that the error of the phase difference between the angle of the crankshaft and the angle of the rotor of the motor generator is made small is satisfied, and the phase difference is calculated when the error of the phase difference is determined to be small. As a result, calculation of the phase difference is avoided when the error of the phase difference is large, to thereby enable reduction of the error of the phase difference between the crank angle and the rotor angle.

DESCRIPTION OF EMBODIMENTS

First Embodiment

Figure 1:
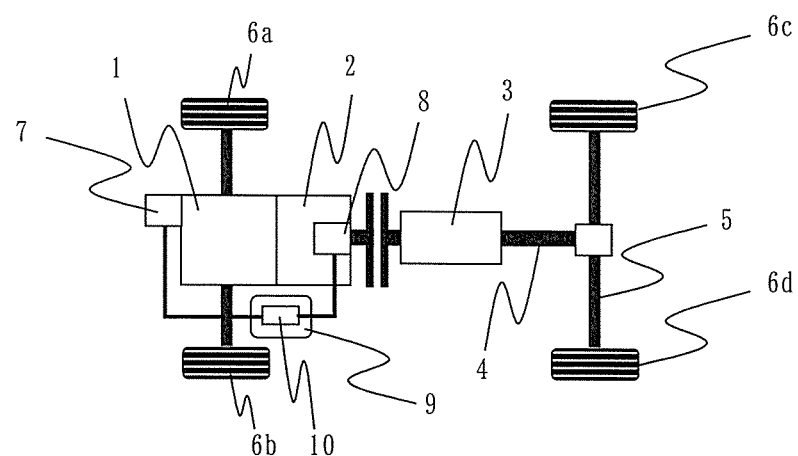
FIG. 1 is a diagram of a schematic configuration including a control device for a hybrid vehicle according to embodiments of the present invention.

FIG. 1 is an illustration of a schematic configuration including a control device for a hybrid vehicle according to a first embodiment of the present invention, where a control method for a hybrid vehicle according to the present invention will be also described simultaneously in an operation of the control device for a hybrid vehicle.

An internal combustion engine 1 and a motor generator 2 are connected to each other directly or via a belt, a gear, or a clutch. Torque generated by the internal combustion engine 1 or the motor generator 2 is transmitted to rear-wheel tires 6a and 6b via a transmission 3, a propeller shaft 4, and a driveshaft 5. Signals from a crank angle sensor 7 configured to detect an angle $\alpha$ of a crankshaft (not shown) of the internal combustion engine 1 and a rotor angle sensor 8 configured to detect an angle $\beta$ of a rotor with respect to a stator (not shown) of the motor generator 2 are input to a microcomputer 10 in a control device 9 for a hybrid vehicle.

Figure 2:
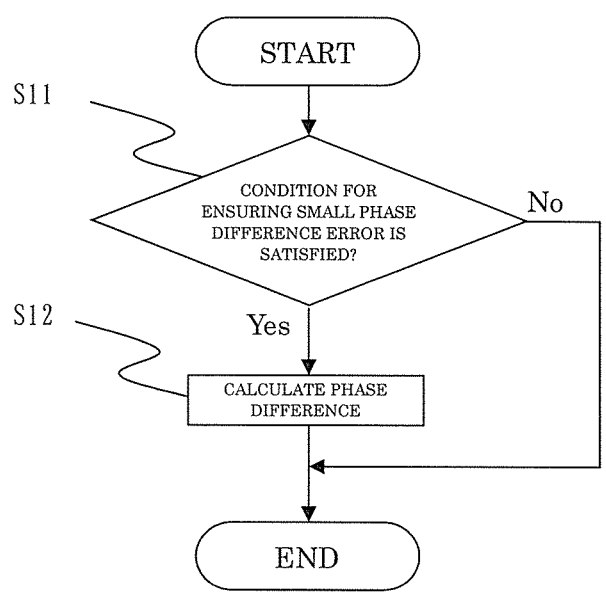
FIG. 2 is a flowchart for illustrating processing of the control device for a hybrid vehicle according to a first embodiment of the present invention.

FIG. 2 is a flowchart for illustrating processing of the control device 9 for a hybrid vehicle according to the first embodiment of the present invention, where the processing is performed by the microcomputer 10 regularly (e.g., every 10 ms). The same applies to flowcharts described below.

Hereinafter, the description of the control device for a hybrid vehicle according to the first embodiment of the present invention will be made, referring to the flowchart of FIG. 2.

First, in Step S11, it is determined whether or not a condition for ensuring that an error of a phase difference between the output signal of the crank angle sensor 7 and the output signal of the rotor angle sensor 8 becomes small is satisfied.

In Step S11, when the condition for ensuring that the error of the phase difference becomes small is satisfied, the processing proceeds to Step 12.

In Step S11, when it is determined that the condition for ensuring that the error becomes small is not satisfied, the processing is finished.

In Step S12, the phase difference between the crank angle $\alpha$ and the rotor angle $\beta$ is calculated. For example, a position of the rotor angle, which is calculated using the output signal of the rotor angle sensor 8, with respect to a reference position (e.g., toothless position) of the crank angle, which is calculated using the signal from the crank angle sensor 7, is calculated, and the difference in angle is made a phase difference.

After that, the processing is finished.

First Example of First Embodiment

Figure 3:
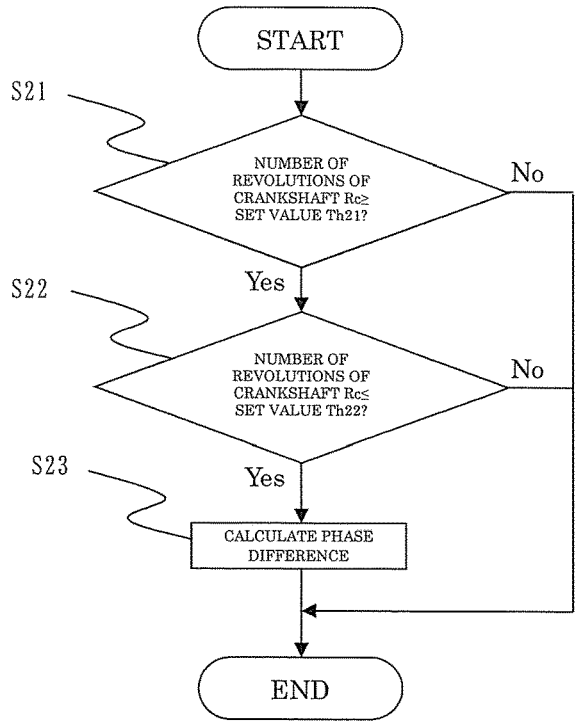
FIG. 3 is a flowchart for illustrating processing of the control device for a hybrid vehicle according to a first example of the first embodiment of the present invention.

FIG. 3 is a flowchart for illustrating processing of the control device 9 for a hybrid vehicle according to the present invention, particularly illustrating a specific first example of the first embodiment described above, where, Step S11 of FIG. 2 is replaced with Steps S21 and S22 in FIG. 3.

Hereinafter, the description of an operation of the control device for a hybrid vehicle according to the first example will be made, referring to the flowchart of FIG. 3.

In Step S21, it is determined whether or not the number of revolutions Rc of the crankshaft in the internal combustion engine is equal to or larger than a predetermined value, i.e. a set value Th21.

In Step S21, when it is determined that the number of revolutions Rc of the crankshaft is equal to or larger than the set value Th21, the processing proceeds to Step 22.

In Step S21, when it is determined that the number of revolutions Rc of the crankshaft is smaller than the set value Th21, the processing is finished.

In Step S22, it is determined whether or not the number of revolutions Rc of the crankshaft in the internal combustion engine is equal to or smaller than a set value Th22.

In Step S22, when it is determined that the number of revolutions Rc of the crankshaft is equal to or smaller than the set value Th22 (Th22≥Rc≥Th21), the processing proceeds to Step 23.

In Step S22, when it is determined that the number of revolutions of the crankshaft is larger than the set value Th22, the processing is finished.

The processing of Step S23 is the same calculation as that of Step S12 of FIG. 2, which has been described in the first embodiment.

After that, the processing is finished.

Second Example of First Embodiment

Figure 4:
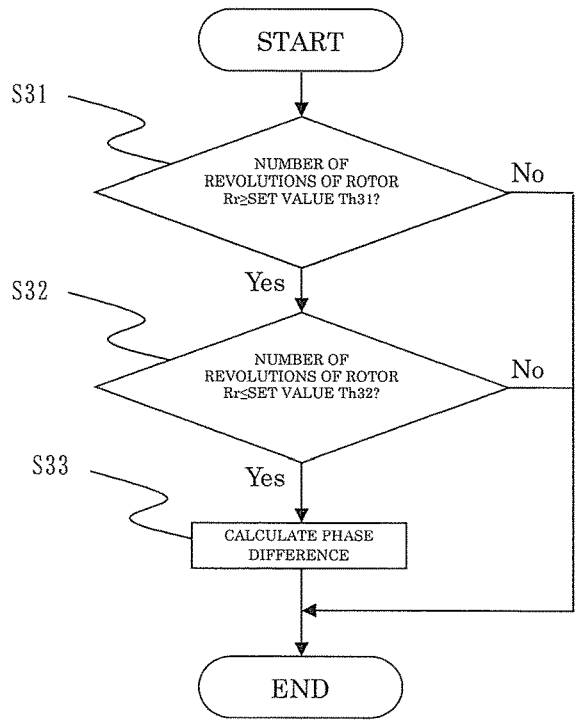
FIG. 4 is a flowchart for illustrating processing of the control device for a hybrid vehicle according to a second example of the first embodiment of the present invention.

FIG. 4 is a flowchart for illustrating processing of the control device 9 for a hybrid vehicle according to the present invention. In particular, FIG. 4 is a specific illustration of a second example of the first embodiment described above, where Step S11 of FIG. 2 is replaced with Steps S31 and S32 in FIG. 4.

Hereinafter, the description of an operation of the control device for a hybrid vehicle according to the second example will be made, referring to the flowchart of FIG. 4.

In Step S31, it is determined whether or not the number of revolutions Rr of the rotor of the motor generator is equal to or larger than a set value Th31.

In Step S31, when it is determined that the number of revolutions Rr of the rotor is equal to or larger than the set value Th31, the processing proceeds to Step 32.

In Step S31, when it is determined that the number of revolutions Rr of the rotor is smaller than the set value Th31, the processing is finished.

In Step S32, it is determined whether or not the number of revolutions Rr of the rotor of the motor generator is equal to or smaller than a set value Th32.

In Step S32, when it is determined that the number of revolutions of the rotor is equal to or smaller than the set value Th32 (Th32≥Rr≥Th31), the processing proceeds to Step 33.

In Step S32, when it is determined that the number of revolutions of the rotor is larger than the set value Th32, the processing is finished.

The processing of Step S33 is the same calculation as that of Step S12 of FIG. 2, which has been described in the first embodiment.

After that, the processing is finished.

Third Example of First Embodiment

Figure 5:
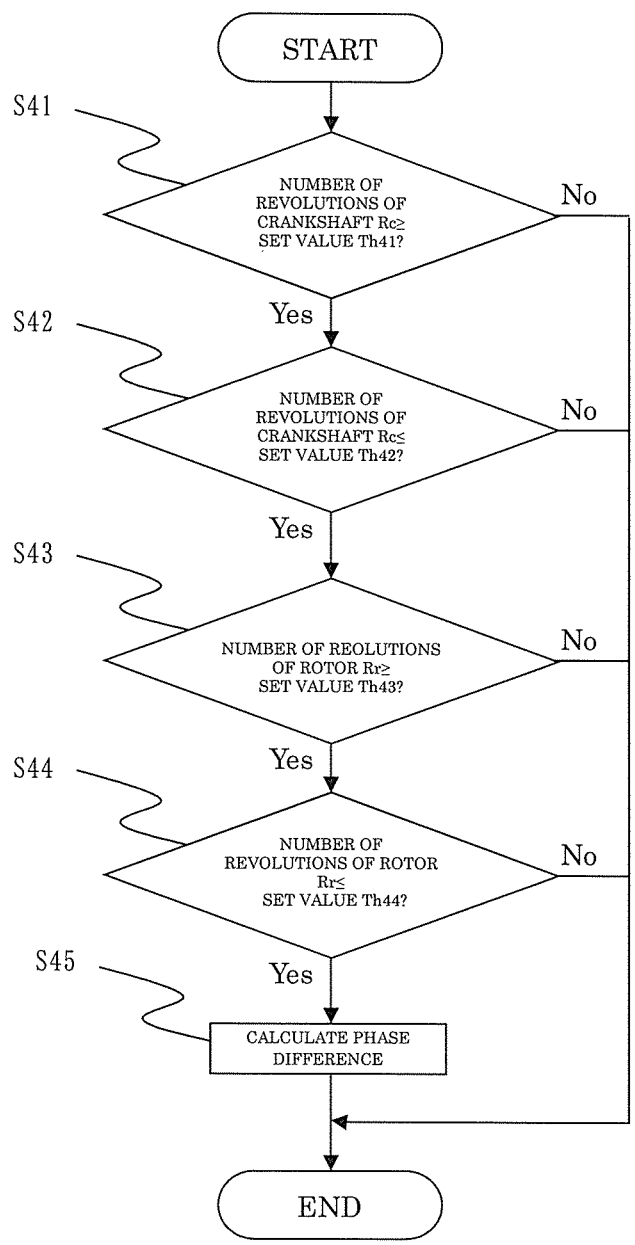
FIG. 5 is a flowchart for illustrating processing of the control device for a hybrid vehicle according to a third example of the first embodiment of the present invention.

FIG. 5 is a flowchart for illustrating processing of the control device 9 for a hybrid vehicle according to the present invention. In particular, FIG. 5 is a specific illustration of a third example of the first embodiment described above, where Step S11 of FIG. 2 is replaced with Steps S41 to S44 in FIG. 5.

Hereinafter, the description of an operation of the control device for a hybrid vehicle according to the third example will be made, referring to the flowchart of FIG. 5.

In Step S41, it is determined whether or not the number of revolutions Rc of the crankshaft in the internal combustion engine is equal to or larger than a set value Th41.

In Step S41, when it is determined that the number of revolutions Rc of the crankshaft is equal to or larger than the set value Th41, the processing proceeds to Step 42.

In Step S41, when it is determined that the number of revolutions Rc of the crankshaft is smaller than the set value Th41, the processing is finished.

In Step S42, it is determined whether or not the number of revolutions Rc of the crankshaft in the internal combustion engine is equal to or smaller than a set value Th42.

In Step S42, when it is determined that the number of revolutions Rc of the crankshaft is equal to or smaller than the set value Th42 (Th42≥Rc≥Th41), the processing proceeds to Step 43.

In Step S42, when it is determined that the number of revolutions of the crankshaft is larger than the set value Th42, the processing is finished.

In Step S43, it is determined whether or not the number of revolutions of the rotor of the motor generator is equal to or larger than a set value Th43.

In Step S43, when it is determined that the number of revolutions of the rotor is equal to or larger than the set value Th43, the processing proceeds to Step 44.

In Step S43, when it is determined that the number of revolutions of the rotor is smaller than the set value Th43, the processing is finished.

In Step S44, it is determined whether or not the number of revolutions of the rotor of the motor generator is equal to or smaller than a set value Th44.

In Step S44, when it is determined that the number of revolutions of the rotor is equal to or smaller than the set value Th44 (Th42≥Rc≥Th41 and Th44≥Rr≥Th43), the processing proceeds to Step 45.

In Step S44, when it is determined that the number of revolutions of the rotor is larger than the set value Th44, the processing is finished.

The processing of Step S45 is the same calculation as that of Step S12 of FIG. 2, which has been described in the first embodiment.

After that, the processing is finished.

It is needless to say that the above-mentioned set values Th41 to Th44 may be replaced with the set values Th21 and Th22 of FIG. 3 and the set values Th31 and Th32 of FIG. 4 described above, respectively.

Fourth Example of First Embodiment

Figure 6:
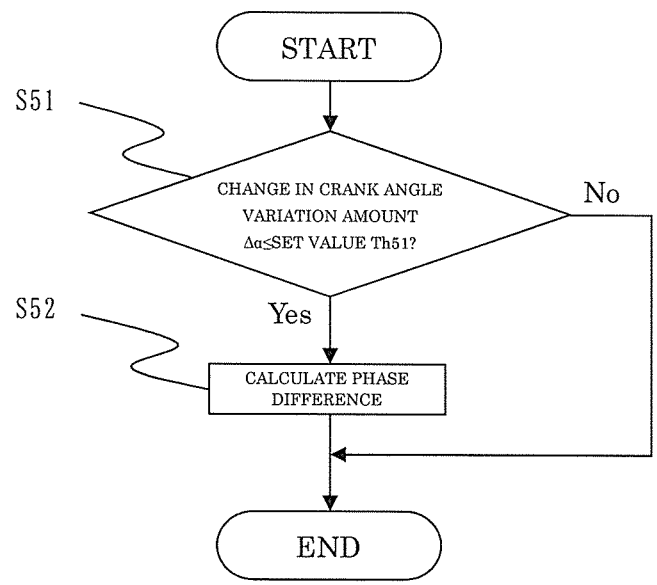
FIG. 6 is a flowchart for illustrating processing of the control device for a hybrid vehicle according to a fourth example of the first embodiment of the present invention.

FIG. 6 is a flowchart for illustrating processing of the control device 9 for a hybrid vehicle according to the present invention. In particular, FIG. 6 is a specific illustration of a fourth example of the first embodiment described above, where Step S11 of FIG. 2 is replaced with Step S51 in FIG. 6.

Hereinafter, the description of an operation of the control device for a hybrid vehicle according to the fourth example will be made, referring to the flowchart of FIG. 6.

In Step S51, it is determined whether or not the amount of temporal variation in angle change of the crankshaft in the internal combustion engine is equal to or smaller than a set value Th51. Specifically, a variation amount $\Delta\alpha$ for a predetermined period of the crank angle calculated using the signal of the crank angle sensor 7, which is input to the microcomputer 10, is calculated to determine whether or not the difference in absolute value $|\Delta\alpha n|-|\Delta\alpha n-1|$ between the last calculated value and the currently calculated value of the variation amount $\Delta\alpha$ is equal to or smaller than the set value Th51. This determination is based on the fact that, when the change in variation amount $\Delta\alpha$ of the crank angle is small, there is unlikely to be a bad impact on the phase difference calculation.

When it is determined that the difference in absolute value is equal to or smaller than the set value Th51 ($|\Delta\alpha n|-|\Delta\alpha n-1|\leq Th51$), the processing proceeds to Step S52.

In Step S51, when it is determined that the amount $\Delta\alpha$ of temporal variation in angle change of the crankshaft in the internal combustion engine has changed from the last calculated amount by more than the set value Th51, the processing is finished.

The processing of Step S52 is the same calculation as that of Step S12 of FIG. 2, which has been described in the first embodiment.

After that, the processing is finished.

Fifth Example of First Embodiment

Figure 7:
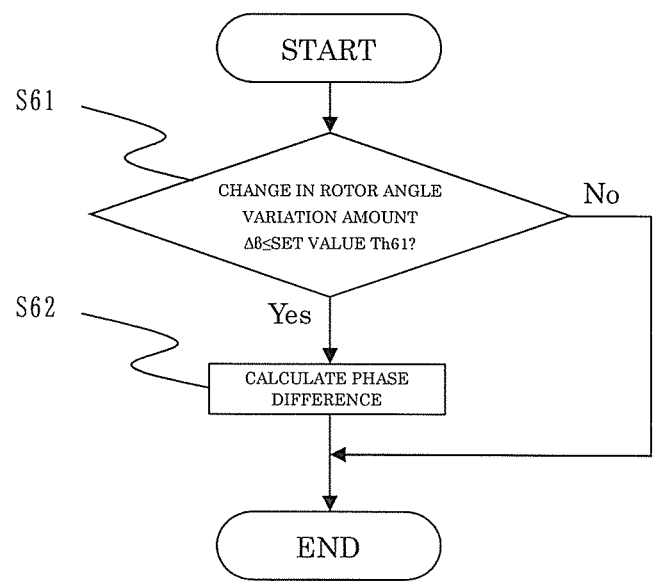
FIG. 7 is a flowchart for illustrating processing of the control device for a hybrid vehicle according to a fifth example of the first embodiment of the present invention.

FIG. 7 is a flowchart for illustrating processing of the control device 9 for a hybrid vehicle according to the present invention. In particular, FIG. 7 is a specific illustration of a fifth example of the first embodiment described above, where Step S11 of FIG. 2 is replaced with Step S51 in FIG. 7.

Hereinafter, the description of an operation of the control device for a hybrid vehicle according to the fifth example will be made, referring to the flowchart of FIG. 7.

In Step S61, it is determined whether or not the amount of temporal variation in angle change of the rotor of the motor generator is equal to or smaller than a set value Th61. Specifically, a variation amount $\Delta\beta$ for a predetermined period of the rotor angle calculated using the signal of the rotor angle sensor 8, which is input to the microcomputer 10, is calculated to determine whether or not the difference in absolute value $|\Delta\beta n|-|\Delta\beta n-1|$ between the last calculated value and the currently calculated value of the variation amount $\Delta\beta$ is equal to or smaller than the set value Th61.

When it is determined that the difference in absolute value is equal to or smaller than the set value Th61 ($|\Delta\beta n|-|\Delta\beta n-1|\leq$Th61), the processing proceeds to Step S62.

In Step S61, when it is determined that the amount $\Delta\beta$ of temporal variation in angle change of the rotor of the motor generator has changed from the last calculated amount by more than the set value Th61, the processing is finished.

The processing of Step S62 is the same calculation as that of Step S12 of FIG. 2, which has been described in the first embodiment.

After that, the processing is finished.

Sixth Example of First Embodiment

Figure 8:
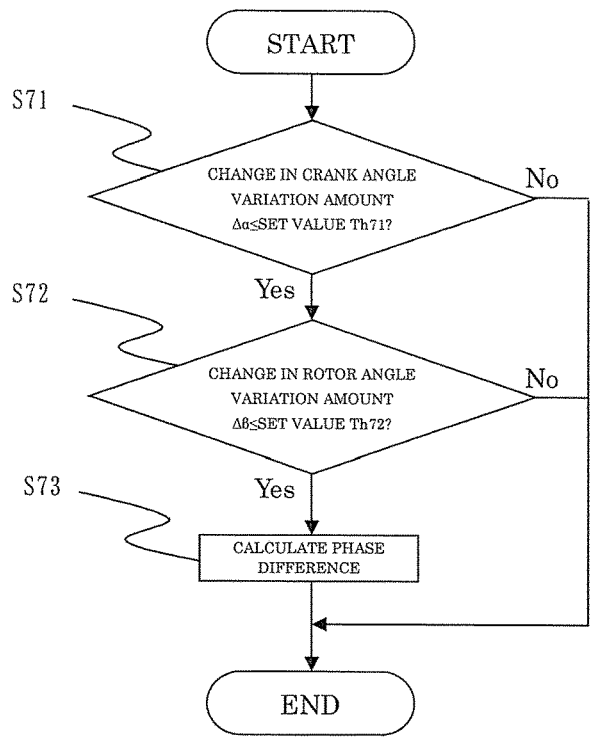
FIG. 8 is a flowchart for illustrating processing of the control device for a hybrid vehicle according to a sixth example of the first embodiment of the present invention.

FIG. 8 is a flowchart for illustrating processing of the control device 9 for a hybrid vehicle according to the present invention. In particular, FIG. 8 is a specific illustration of a sixth example of the first embodiment described above, where Step S11 of FIG. 2 is replaced with Steps S71 and S72 in FIG. 8.

Hereinafter, the description of an operation of the control device for a hybrid vehicle according to the sixth example will be made, referring to the flowchart of FIG. 8.

In Step S71, it is determined whether or not the amount $\Delta\alpha$ of temporal variation in angle change of the crankshaft in the internal combustion engine has changed from the last calculated amount by a set value Th71 or less. Specifically, the variation amount $\Delta\alpha$ for a predetermined period of the crank angle calculated using the signal of the crank angle sensor 7, which is input to the microcomputer 10, is calculated to determine whether or not the difference in absolute value $|\Delta\alpha n|-|\Delta\alpha n-1|$ between the last calculated value and the currently calculated value of the variation amount $\Delta\alpha$ is equal to or smaller than the set value Th71.

When it is determined that the difference in absolute value is equal to or smaller than the set value Th71 ($|\Delta\alpha n|-|\Delta\alpha n-1|\leq$Th71), the processing proceeds to Step S72.

In Step S71, when it is determined that the amount $\Delta\alpha$ of temporal variation in angle change of the crankshaft in the internal combustion engine has changed from the last calculated amount by more than the set value Th71, the processing is finished.

In Step S72, it is determined whether or not the amount $\Delta\beta$ of temporal variation in angle change of the rotor of the motor generator has changed from the last calculated amount by a set value Th72 or less. Specifically, the variation amount $\Delta\beta$ for a predetermined period of the rotor angle calculated using the signal of the rotor angle sensor 8, which is input to the microcomputer 10, is calculated to determine whether or not the difference in absolute value $|\Delta\beta n|-|\Delta\beta n-1|$ between the last calculated value and the currently calculated value of the variation amount $\Delta\beta$ is equal to or smaller than the set value Th72.

When it is determined that the difference in absolute value is equal to or smaller than the set value Th72 ($|\Delta\alpha n|-|\Delta\alpha n-1|\leq$Th71 and $|\Delta\beta n|-\beta\Delta\beta n-1|\leq$Th72), the processing proceeds to Step S73.

In Step S72, when it is determined that the amount $\Delta\beta$ of temporal variation in angle change of the rotor of the motor generator has changed from the last calculated amount by more than the set value Th72, the processing is finished.

The processing of Step S73 is the same calculation as that of Step S12 of FIG. 2, which has been described in the first embodiment.

After that, the processing is finished.

It is needless to say that the above-mentioned set values Th71 and Th72 may be replaced with the set value Th51 of FIG. 5 and the set value Th61 of FIG. 6, respectively.

Second Embodiment

Figure 9:
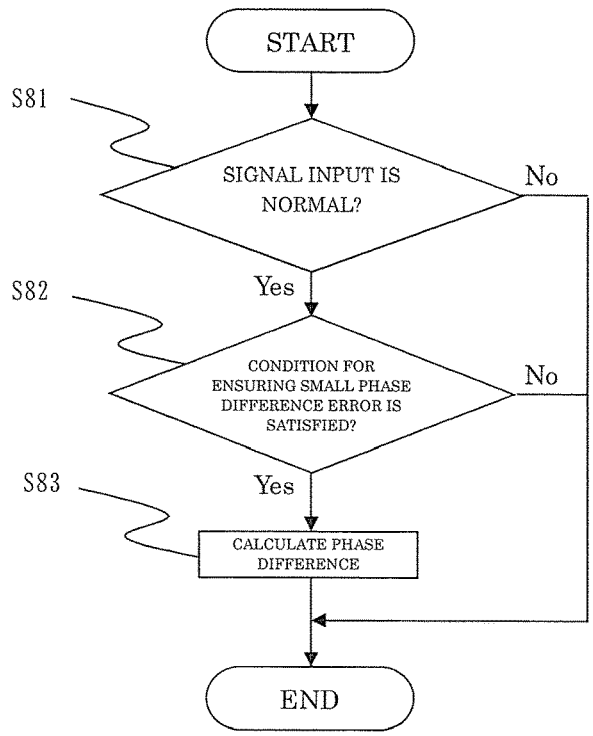
FIG. 9 is a flowchart for illustrating processing of a control device for a hybrid vehicle according to a second embodiment of the present invention.

FIG. 9 is a flowchart for illustrating processing of the control device 9 for a hybrid vehicle according to a second embodiment of the present invention.

Hereinafter, the description of the control device for a hybrid vehicle according to the second embodiment of the present invention will be made, referring to the flowchart of FIG. 9.

In Step S81, it is determined whether or not a signal necessary for the phase difference calculation is input normally. When it is determined that the signal input is normal, the processing proceeds to Step S82.

In Step S81, when it is determined that the signal input necessary for the phase difference calculation is not normal, the processing is finished.

The processing of Step S82 is the same determination as that of Step S11 of FIG. 2, which has been described in the first embodiment.

The processing of Step S83 is the same calculation as that of Step S12 of FIG. 2, which has been described in the first embodiment.

While in FIG. 9, the processing of Step S82 is the same determination as that of Step S11 of FIG. 2, which has been described in the first embodiment, the processing of Step S82 may be replaced with execution of any one of the processing procedures described in the first to sixth examples of the first embodiment described above.

First Example of Second Embodiment

Figure 10:
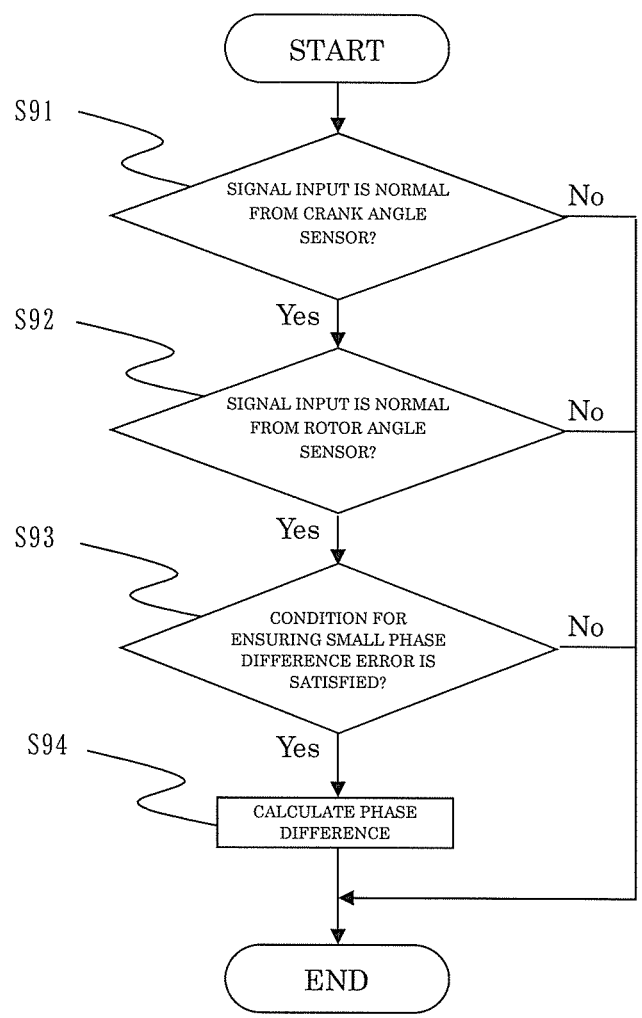
FIG. 10 is a flowchart for illustrating processing of the control device for a hybrid vehicle according to a first example of the second embodiment of the present invention.

FIG. 10 is a flowchart for illustrating processing of the control device 9 for a hybrid vehicle according to the present invention, particularly illustrating a specific first example of the second embodiment described above, where Step S81 of FIG. 9 is replaced with Steps S91 and S92 in FIG. 10.

Hereinafter, the description of an operation of the control device for a hybrid vehicle according to the first example will be made, referring to the flowchart of FIG. 10.

In Step S91, it is determined whether or not a signal is input normally from the crank angle sensor 7. Specifically, the determination of normality is performed based on, for example, whether or not an input pattern of the crank angle signal exhibits a regular pattern. When it is determined that the signal input is normal, the processing proceeds to Step S92.

In Step S91, when it is determined that a signal is not input normally from the crank angle sensor 7, the processing is finished.

In Step S92, it is determined whether or not a signal is input normally from the rotor angle sensor 8. Specifically, whether or not input from the rotor sensor is normal is determined. When it is determined that the signal input is normal, the processing proceeds to Step S93.

In Step S92, when it is determined that the signal is not input normally from the rotor angle sensor 8, the processing is finished.

The processing of Step S93 is the same determination as that of Step S11 of FIG. 2, which has been described in the first embodiment.

The processing of Step S94 is the same calculation as that of Step S12 of FIG. 2, which has been described in the first embodiment.

In FIG. 10, the processing of Step S93 is the same determination as that of Step S11 of FIG. 2, which has been described in the first embodiment. However, the processing of Step S93 may be replaced with execution of any one of the processing procedures described in the first to sixth examples of the first embodiment described above.

The invention claimed is:

1. A control device for a hybrid vehicle, in which a crankshaft of an internal combustion engine is connected to a motor generator, the control device comprising:
   a crank angle sensor configured to detect an angle of the crankshaft;
   a rotor angle sensor configured to detect an angle of a rotor of the motor generator; and
   a calculation unit configured to determine whether or not a condition regarding an error of a phase difference between the angle of the crankshaft and the angle of the rotor of the motor generator is satisfied, and to calculate the phase difference when the condition is determined to be satisfied,
   wherein the calculation unit is configured to set the condition regarding the error of the phase difference so as to determine that a number of revolutions of the rotor of the motor generator is equal to or larger than a first set value and equal to or smaller than a second set value.

2. The control device for a hybrid vehicle according to claim 1, wherein the calculation unit is configured to additionally set the condition regarding the error of the phase difference so as to determine whether or not a number of revolutions of the crankshaft of the internal combustion engine is equal to or larger than a third set value and equal to or smaller than a fourth set value.

3. The control device for a hybrid vehicle according to claim 1, wherein the calculation unit is configured to set the condition regarding the error of the phase difference so as to determine that an amount of temporal variation in angle change of the crankshaft of the internal combustion engine has changed from a last calculated amount by a third set value or less.

4. The control device for a hybrid vehicle according to claim 1, wherein the calculation unit is configured to set the condition regarding the error of the phase difference so as to determine that an amount of temporal variation in angle change of the rotor of the motor generator has changed from a last calculated amount by a third set value or less.

5. The control device for a hybrid vehicle according to claim 1, wherein the calculation unit is configured to set the condition regarding the error of the phase difference so as to determine that an amount of temporal variation in angle change of the crankshaft of the internal combustion engine has changed from a last calculated amount by a third set value or less, and that an amount of temporal variation in angle change of the rotor of the motor generator has changed from a last calculated amount by a fourth set value or less.

6. The control device for a hybrid vehicle according to claim 1, wherein the calculation unit is configured to calculate the phase difference when a necessary input signal is normal.

7. The control device for a hybrid vehicle according to claim 6, wherein the calculation unit is configured to use a signal input from the crank angle sensor and a signal input from the rotor angle sensor as the necessary input signal.

8. A control method for a hybrid vehicle, in which a crankshaft of an internal combustion engine is connected to a motor generator, the control method comprising:
   detecting an angle of the crankshaft;
   detecting an angle of a rotor of the motor generator; and
   determining whether or not a condition regarding an error of a phase difference between the angle of the crankshaft and the angle of the rotor of the motor generator is satisfied, and calculating the phase difference when the condition is determined to be satisfied,
   wherein the condition regarding the error of the phase difference is additionally set to determine when a number of revolutions of the rotor of the motor generator is equal to or larger than a first set value and equal to or smaller than a second set value.

9. The control method for a hybrid vehicle according to claim 8, wherein the condition regarding the error of the phase difference is additionally set to determine when a number of revolutions of the crankshaft of the internal combustion engine is equal to or larger than a third set value and equal to or smaller than a fourth set value.

10. The control method for a hybrid vehicle according to claim 8, wherein the condition regarding the error of the phase difference is set to determine when an amount of temporal variation in angle change of the crankshaft of the internal combustion engine has changed from a last calculated amount by a third set value or less.

11. The control method for a hybrid vehicle according to claim 8, wherein the condition regarding the error of the phase difference is set to determine when an amount of temporal variation in angle change of the rotor of the motor generator has changed from a last calculated amount by a third set value or less.

12. The control method for a hybrid vehicle according to claim 8, wherein the condition regarding the error of the phase difference is set to determine when an amount of temporal variation in angle change of the crankshaft of the internal combustion engine has changed from a last calculated amount by a third set value or less, and that an amount of temporal variation in angle change of the rotor of the motor generator has changed from a last calculated amount by a fourth set value or less.

13. The control method for a hybrid vehicle according to claim 8, wherein the phase difference is calculated when a necessary input signal is normal.

14. The control method for a hybrid vehicle according to claim 13, wherein an angle signal of the crankshaft and an angle signal of the rotor are used as the necessary input signal.

* * * * *